United States Patent [19]

Durston

[11] Patent Number: 4,691,336

[45] Date of Patent: Sep. 1, 1987

[54] TELEPHONE TEST SET HAVING AN AUXILIARY AMPLIFIER AND SPEAKER FOR PERMITTING LISTENING TO LINE SIGNALS

[75] Inventor: Thomas W. Durston, Camarillo, Calif.

[73] Assignee: Harris Corporation, Melbourne, Fla.

[21] Appl. No.: 917,480

[22] Filed: Oct. 10, 1986

[51] Int. Cl.⁴ .......................................... H04M 3/22
[52] U.S. Cl. ................................. 379/21; 379/420; 379/388
[58] Field of Search ............... 379/29, 420, 388, 390, 379/21, 221, 421

[56] References Cited
U.S. PATENT DOCUMENTS 3,792,205 2/1974 O'Dea .................................. 379/21
3,928,723 12/1975 Kai ..................................... 379/420

Primary Examiner—Stafford D. Schreyer
Attorney, Agent, or Firm—Antonelli, Terry & Wands

[57] ABSTRACT

An improved telephone test unit is disclosed which permits the telephone line technician to selectively choose the audio reproduction of signals ocurring on the line without the use of the handset in the test unit. An auxiliary amplifier is provided to amplify the signals which are received from the telphone line. When the amplifier is activated, the transmitting unit and receiving unit of the handset within the telephone test unit are electronically muted to prevent undesirable audio feedback to the amplifier. The gain of the amplifier may be selectively varied between an off, low and a high gain condition. The amplifier is also usable in the "monitor" condition of the telephone test unit.

10 Claims, 4 Drawing Figures

TELEPHONE TEST SET HAVING AN AUXILIARY AMPLIFIER AND SPEAKER FOR PERMITTING LISTENING TO LINE SIGNALS

CROSS-REFERENCE TO RELATED APPLICATIONS

Reference is made to application Ser. No. 813,156, filed on Dec. 24, 1985, which is assigned to the assignee of the present application and names Richard W. Faith and Thomas W. Durston as inventors. This application discloses a telephone test set of the type described in the present application. Ser. No. 813,156 is incorporated herein by reference in its entirety.

BACKGROUND OF THE INVENTION

1. Field of the Invention

The present invention relates to telephone test sets having an auxiliary amplifier and speaker for permitting listening to signals on a telephone line during repair procedures.

2. Description of the Prior Art

The assignee of the present invention sold an amplifier specifically designed for connection to the Model TS-21 test set. This amplifier was contained in a separate case which had a plug-in connector for connection to the Model TS-21 test set to amplify and generate an audio signal in a loudspeaker of the signals present on a telephone line being tested by a technician using the test set. The amplifier was shunted across the receiver within the telephone test set. It contained an on/off switch and a volume control. The amplifier contained an electronic sensor which activated the amplifier in response to the detection of loop current. The system would not work on "dry loops" which were not connected to the battery of the central office.

The prior art system did not permit amplification of line signals in the so-called "monitor model". In the monitor mode, prior art telephone test sets capacitively couples signals on the line to make them audible over the receiver in the telephone test set without drawing sufficient loop current to disturb any conversations which were ongoing on the line. Finally, the prior art amplifier in combination with the Model TS-21 test set did not permit automatic muting of the transmitter and receiver when the amplifier was activated.

SUMMARY OF THE INVENTION

The present invention provides a telephone test set which is useful for performing various functions during routine maintenance operations on a telephone line by a telephone line technician. With the invention, when the telephone line technician is communicating with the central office, it often happens that the call is placed on hold. The present invention permits the telephone line technician to place the unit on the technician's belt and listen to communications coming down the line from the central office which are amplified and broadcast by the loudspeaker while permitting the technician to perform other functions. Second, the telephone line technician may use the amplifier and loudspeaker to listen for voice synthesized dispatches from the central office and communications from automated test equipment located in the central office. An exemplary system of this nature is marketed by the assignee of the present invention under the mark "DATU". A voice synthesized dispatch and automated test equipment system is described in U.S. patent application Ser. No. 816,158, filed Jan. 3, 1986, now U.S. Pat. No. 4,670,898, which is assigned to the assignee of the present invention. Third, with the invention, the amplifier and loudspeaker may be used to listen to communications on the line occurring during the monitor mode without any possibility of disturbing the ongoing communications which would occur if the test set were placed in the normal mode of operation in which the transmitting and receiving units are activated.

One of the primary advantages of the present invention is that it permits the telephone line technician to audibly monitor communications occurring on a telephone line in diverse testing and maintenance situations without undesirable audio feedback from the transmitter and receiver built into the telephone test unit. In a typical situation, the telephone line technician will hang the test unit on a belt loop and activate the amplifier to audibly broadcast any signals occurring on the line while permitting operations to be performed with the hands without requiring use of the transmitting and receiving unit.

A telephone test set in accordance with the invention includes a coupling device for coupling the test set to tip and ring lines of a telephone line; a transmitter and a receiver which are selectively coupled to the coupling unit; a selectively energizable amplifier for amplifying signals occurring on the telephone line; a speaker coupled to the amplifier for reproducing signals occurring on the telephone line; and a control unit for disabling the transmitter and the receiver in response to the amplifier being energized. In disabling the transmitter and receiver, the control circuit short circuits the receiver and open circuits the transmitter. The test set may be provided with a monitoring circuit for selectively monitoring the audio communications and signals occurring on the telephone line by driving the receiver from current on the telephone line. A switch is provided for selecting either the monitor mode or the normal talk mode when the transmitter and receiver are both activated. In the monitor mode the amplifier and speaker may be selectively activated.

The control unit includes a circuit for activating the amplifier and further when the amplifier is activated, a circuit for selectively choosing the gain of the amplifier. The circuit for activating the amplifier and the circuit for selectively choosing the gain of the amplifier includes a circuit for producing an input signal; and a counting circuit, coupled to the circuit for producing an input signal for sequentially counting three separate states in response to three successive input signals, each of the separate states respectively causing the amplifier to operate in an off condition, at a first gain, and at a second gain.

A telephone set in accordance with the invention further includes signalling circuitry for generating signals which are selectively coupled to the coupling circuit for producing signals to place a call or other information on a telephone line. A series network switch is coupled between the coupling unit and the transmitter and the receiver. The series network switch has an open circuit condition for disconnecting the transmitter and receiver from the coupling unit when the signalling unit is activated and a closed circuit condition when the transmitter and the receiver is activated and a shunt circuit for providing a relatively high impedance shunt, when compared to the impedance of the series network switch in the closed circuit condition, which is coupled to the amplifier when the series network switch is in the open circuit condition. The shunt circuit permits the amplifier and loudspeaker to be activated during operation of the signalling circuitry.

DESCRIPTION OF THE PREFERRED EMBODIMENT

Figure 1:
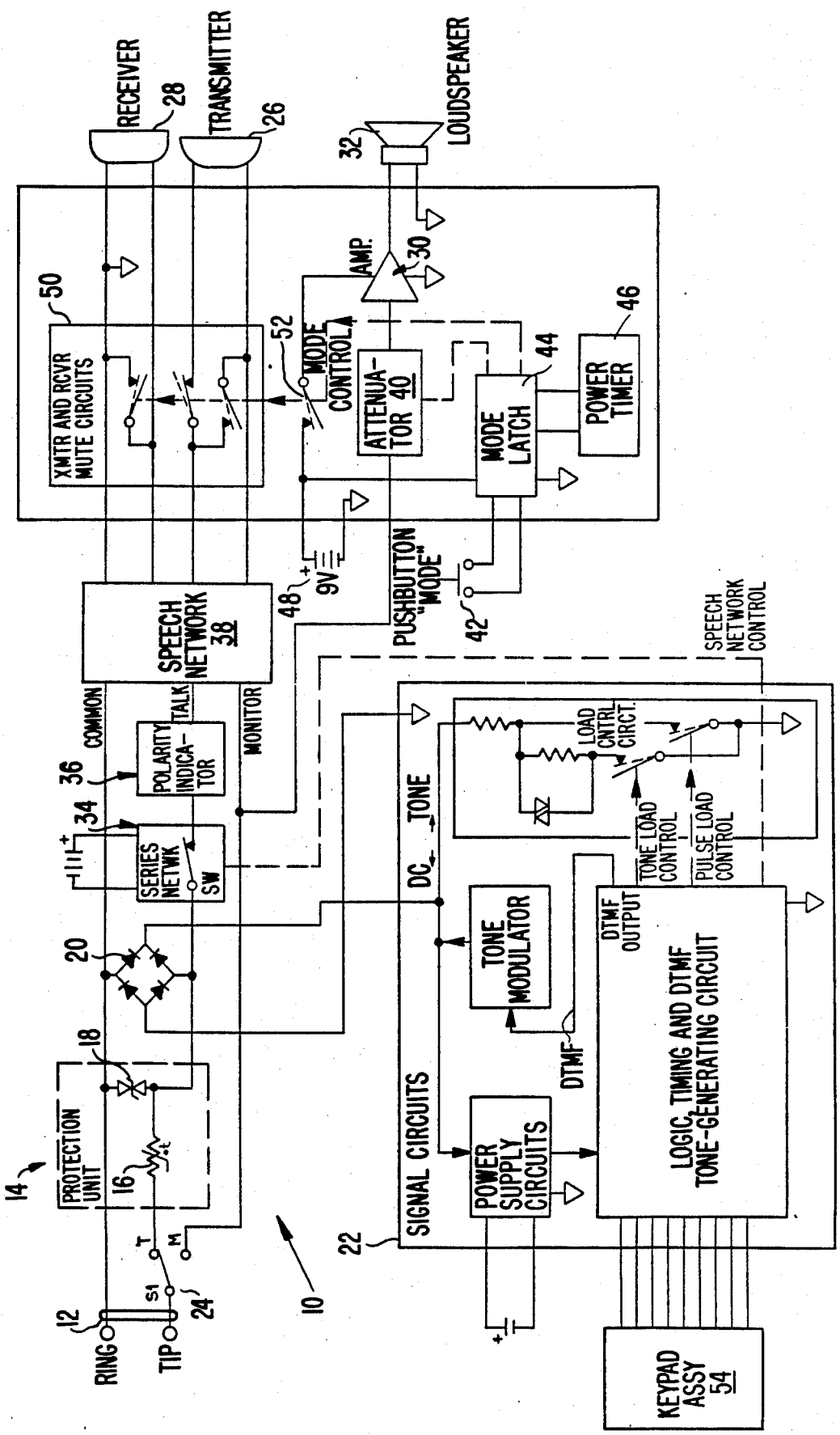
FIG. 1 is a block diagram of the present invention.

FIG. 1 illustrates a block diagram of the present invention. The present invention 10 is connected to a tip and a ring line of a telephone line by a coupling unit 12 which is of conventional construction that may include a pair of clips for selective connection to the tip and ring lines. A protection unit 14 is provided for overvoltage protection and thermal protection. The protection unit 14 includes a thermistor 16 and a surgector 18, manufactured by RCA Corp. and others, which respectively provide thermal protection for long term overcurrent conditions and protection against high voltage surges. A fullwave-rectifier 20 is provided for providing ground and positive potentials for application to signalling circuits 22. A switch 24 permits the selective choice of the talk mode, which is identified by the letter "T", and the monitor mode, which is identified by the letter "M". In the talk mode, the present invention activates the transmitter and receiver 26 and 28. In the monitor mode, the speech network 38 couples signals on the telephone line to the receiver 28 to permit monitoring of the telephone line without disturbing the line in the manner known in the art. Alternatively, in the monitor mode, the amplifier 30 and loudspeaker 32 may be activated as described below to provide an audible reproduction of the line signals on the line being monitored by the loudspeaker including voice, synthesized voice, dialing and signalling signals appearing on the telephone line. In the monitor mode, the transmitter 26 is decoupled by the speech network 38 from the telephone line. In the monitor mode when the amplifier 30 is activated, the receiver 28 is deactivated by the control circuit discussed below in conjunction with FIGS. 2A-C. The series network switch 34 is opened in response to the activation of the signalling circuits 22 to disconnect the transmitter 26 and receiver 28 from the telephone line during the activation of the signalling circuits. The continuity polarity indicator 36 is a pair of oppositely poled light emitting diodes which are respectively colored with different colors to permit the telephone line technician to visually determine the polarity of the individual lines of the telephone line to which the individual connectors of the coupling unit 12 are connected. The speech network 38 includes a passive hybrid network of a construction similar to that commonly used in ordinary telephone sets which is useful for both the monitor and talk modes. An attenuator 40 is provided for controlling the gain level of the output signal from the amplifier 30. The combination of a pushbutton mode switch 42 and a mode latch 44 permits the telephone line technician to selectively operate the amplifier 30 and loudspeaker 32 to produce an audible representation of the signals appearing on a telephone line and to selectively choose a first or a second gain level when the amplifier 30 is activated. The mode latch 44 functions to count and hold three separate conditions sequentially in response to the sequential closing of the pushbutton mode switch 42. A power timer 46 is provided to disable the operation of the amplifier 30 after an elapsed time has occurred in which no signals have appeared on the telephone line for a period between 5 and 8 minutes. The power timer 46 turns off the amplifier 30 if no signals have been received above a certain threshold after 5 to 8 minutes. If the amplified audio signal exceeds the threshold level in the level detector of the power timer 46, the timer is reset allowing continued operation of the amplifier 30. The power timer 46 functions to conserve the power supply provided by a 9-volt battery 48. A mute switch 50 is provided for controlling the transmitter 26 and receiver 28 in a conventional manner. Mode switch 52 is selectively opened and closed under the control of the mode latch 44 to control the application of power to the amplifier 30. A keypad assembly 54 is connected to the signalling circuits 22 to provide inputs for selectively activating the generation of DTMF tones. The signalling circuits 22 include power supply circuits, a tone modulator, load control circuit and logic, timing and DTMF tone-generating circuit of conventional construction. FIG. 6 of Ser. No. 813,156 illustrates a suitable keypad assembly and circuits for implementing the function of the signalling circuits 22.

Figure 2A:
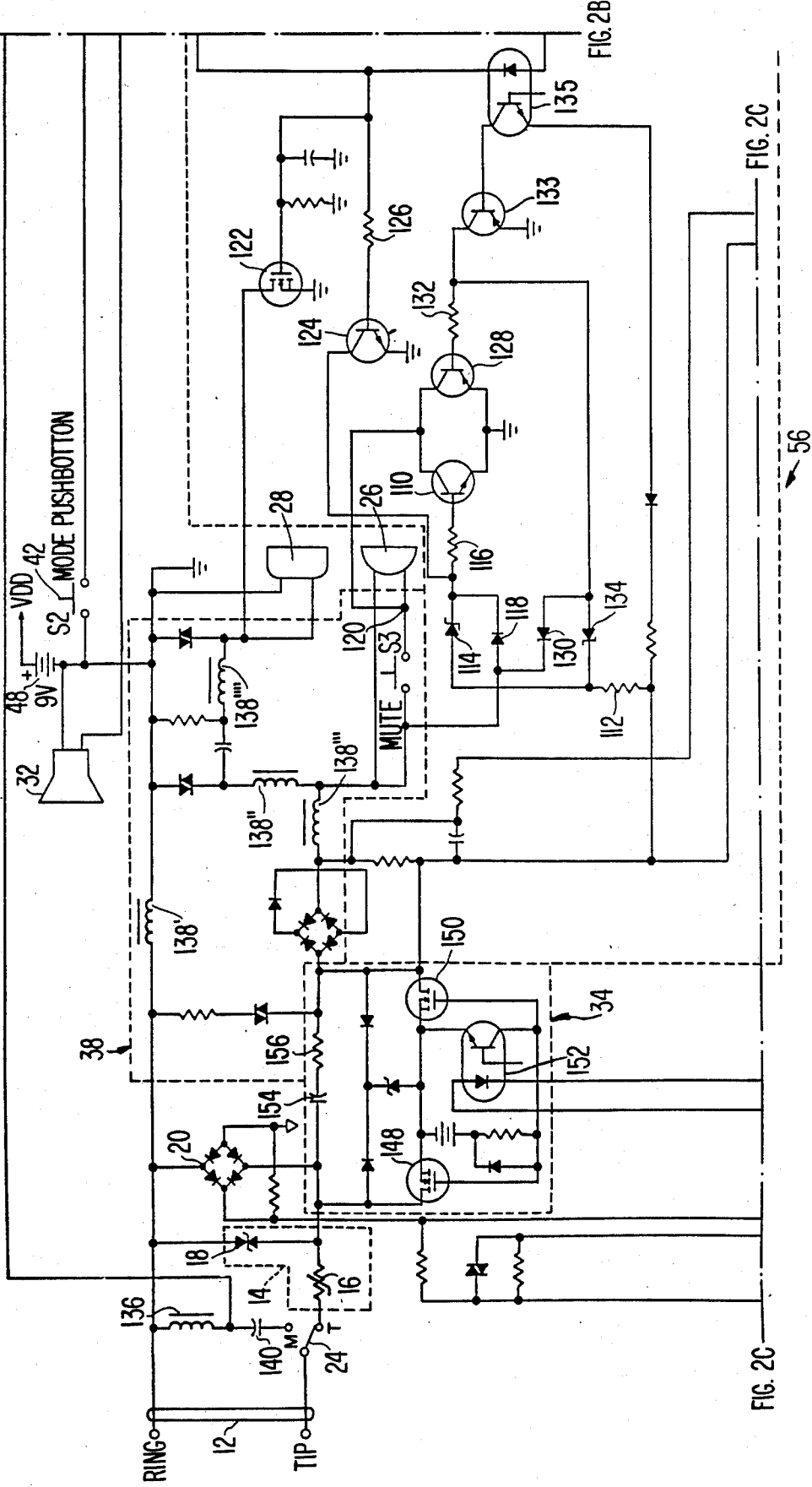
FIGS. 2A-C are a detailed electrical schematic of the preferred embodiment of the present invention.
Figure 2B:
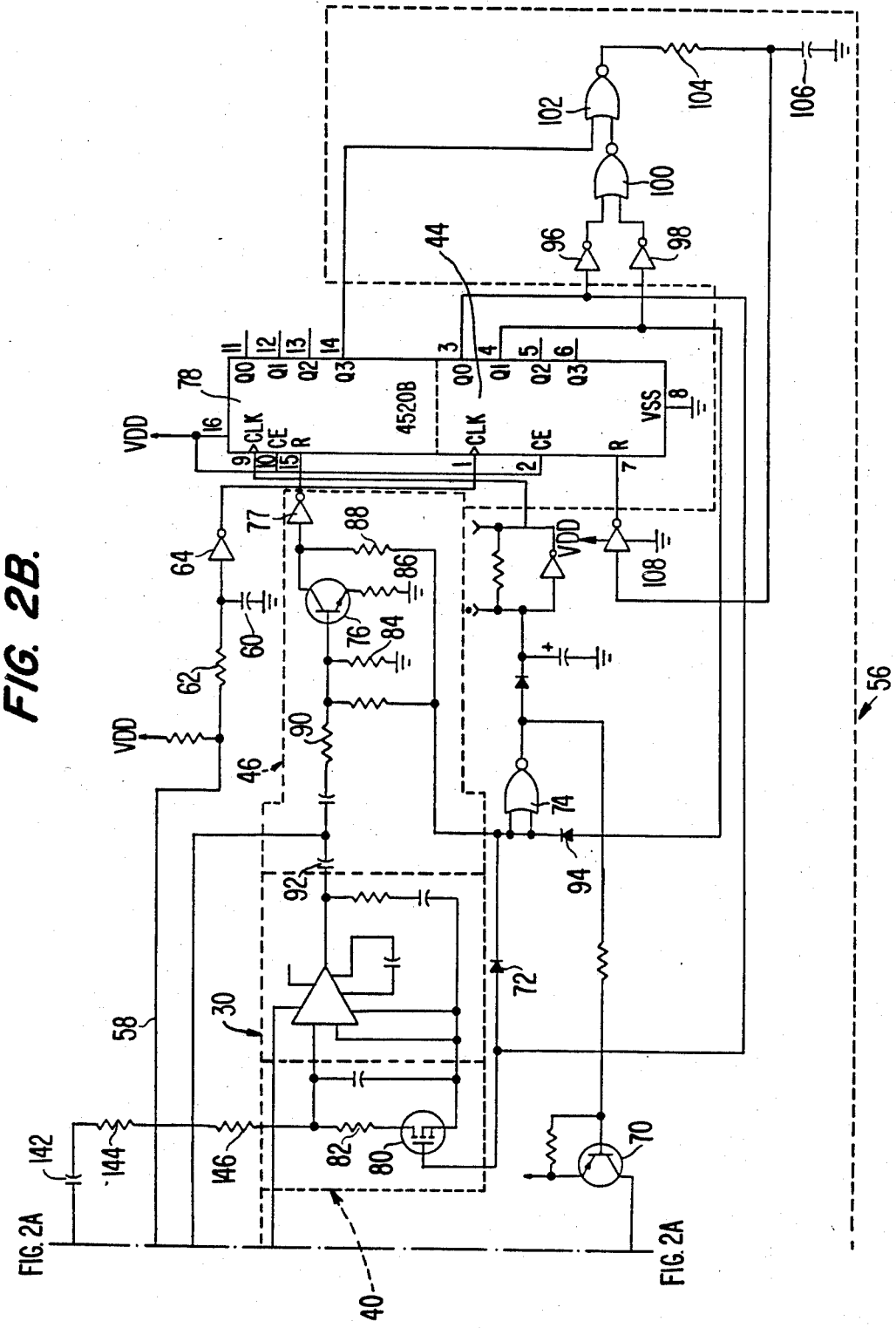
Figure 2C:
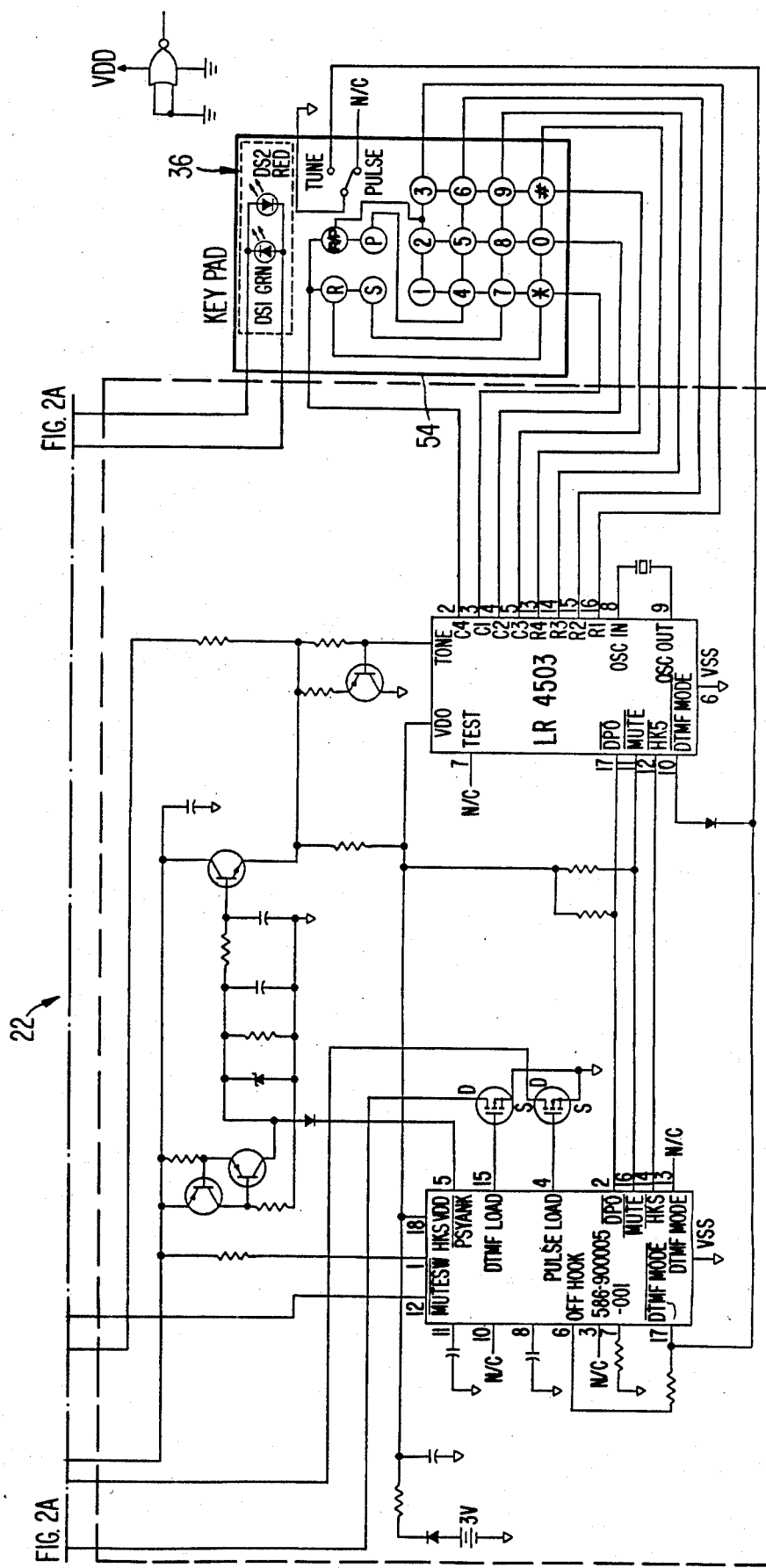

FIGS. 2A-C illustrate a detailed electrical schematic of the preferred embodiment of the present invention. Like parts in FIGS. 1 and 2A-C are identified by the same reference numerals. Parts which are identified in a labelled block in FIG. 1 are identified by a block closed by a dotted line in FIGS. 2A-C. Integrated circuits are identified by their convention part numbers.

Amplifier Mode Latch 44 and Control Circuit 56

The overall function of the amplifier mode latch 44 and control circuit 56 is to permit the user of the telephone test unit to selectively control the activation of the amplifier 30 and, if the amplifier 30 is activated, to select either a first gain or a second gain to control the volume of the signal audibly produced on the loudspeaker 32. Additionally, during operation of the amplifier 30 the control circuit 56 automatically electronically mutes the transmitter 26 and receiver 28 to prevent audio feedback into the amplifier. During muting, the control circuit 56 short circuits the receiving unit 26 and open circuits the transmitting unit 28.

The mode pushbutton 42 determines the operation of the amplifier 30 to select the off mode, low gain amplification mode and high gain amplification mode as described below. The telephone line technician presses the mode pushbutton 42 located in the telephone test set to advance to the next operating mode as defined above. If the amplifier 30 is operating in either of the two amplification modes, the power timer 46 shuts off the power supply 5 to 8 minutes after the last signal is detected on the leads of the coupling unit 12.

The mode latch 44 controls and retains the mode set by the mode pushbutton 42. In the "off" mode, as set by the mode pushbutton 42 or the power timer 46, the mode latch 44 turns off the power supply and enables normal operation of the test set transmitter 26 and receiver 28. In the low gain mode, the amplifier 30 is turned on, and the audio input is set to the low gain (attenuated) path through the attenuator 40 to the input of the amplifier 30. In the high gain mode, the amplifier 30 remains on, but its input is connected directly to the source of audio without being shunted by the attenuator 40. In both modes of amplification, the transmitter 26 and receiver 28 are muted to prevent acoustic feedback (howling and squealing) from the speaker 32. It was discovered in conjunction with the assignee's prior amplifier used with the TS21 test set, that the receiver acts as a microphone which fed audio signals into the amplifier. The relatively high gain of the amplifier produced unacceptable acoustic coupling to the loudspeaker associated with the amplifier.

Control of the amplifier 30 as a function of the operation of the mode pushbutton switch 42 and mode latch is as follows. Pressing of the mode pushbutton switch 42 causes a ground to appear on the line 58 which discharges the debounce capacitor 60 through resistor 62. After a 10 millisecond discharge to a logic zero on capacitor 60, the logic level on the output of inverter 64 goes high, clocking the mode latch 44 to advance to the next state. If the mode latch 44 was previously in the reset state, the output Q0 will go high. Upon release of the pushbutton mode switch 42, capacitor 60 charges back up to VDD through resistor 62. Upon the recharging of capacitor 60, the output of inverter 64 goes low with no change in the state of the mode latch 44. When the output terminal Q0 of the mode latch 44 goes high, the amplifier power switch transistor 70 is turned on as a result of the high logic level conducted by diode 72 at NOR gate 74 which activates the battery timer 46 for the initiation of the time-out period. The high logic level from terminal Q0 of the mode latch 44 powers the timer reset transistor 76. When no signal is amplified by the amplifier 30 and with the output level Q0 set to a high logic level, inverted by inverter 77, the timer 46 reset input at pin 15 of counter 78 is inactive at a low logic level. As a result of the output Q0 of the mode latch 44 being at a high logic level, field effect transistor 80 is turned on grounding the 6 dB input signal attenuator resistor 82 setting the low gain amplifier mode state. If the pushbutton mode switch 42 is pressed again, another clock signal is generated at the input of inverter 64, as described above, advancing the mode latch 44 to the next state at which the output Q0 is equal to a low logic level and the output Q1 is equal to a high logic level. The power switch transistor 70, the power timer oscillator including transistor 76, inverter 77, resistors 84, 86, 88 and 90 and capacitor 92 continue operation via diode 94. The oscillator cyclically produces pulses which are counted by counter 78. The time interval of the timer 46 is determined by counting a predetermined number of pulses. The low logic level on the output Q0 of the mode latch 44 causes the field effect transistor 80 to turn off which removes the ground from the attenuator resistor 82. In this second mode, the amplifier 30 is in the high gain state and remains there until the power timer 46 times out or the pushbutton mode switch 42 is pressed a third time.

The mode latch 44 is reset to the off state by one of two methods. The first, as just described, is when the mode pushbutton switch 42 is pressed a third time. In this state, the mode latch 44 is clocked, and both the outputs Q0 and Q1 go high. The resultant high logic level state signals are inverted by inverters 96 and 98, ANDed by NOR gate 100 outputting a high logic level. The resultant high logic level at the output of NOR gate 100 is NORed by NOR gate 102 to provide a low logic level logic through a 10 millisecond RC delay produced by resistor 104 and capacitor 106 which is applied to inverter 108. This RC delay, which time period is not critical, is required to guarantee a minimum reset signal at the reset terminal of the mode latch 44 and prevents malfunctions caused by coincidence of the mode latch 44 outputs from inadvertently resetting the mode latch as it is clocked from low gain to high gain modes. The low logic level state at the input to inverter 108 results in a high logic level at the reset pin 7 of the mode latch 44 causing the resetting of the mode latch turning both the outputs Q0 and Q1 to a low logic level logic and turning the amplifier 30 and related circuitry off. The logic reset pulse returns to a low logic level after 10 milliseconds since the Q0 and Q1 outputs of the mode latch 44 have been reset, and the mode latch 44 is again ready to be activated by the pushbutton mode switch 42. The other means of resetting the mode latch 44 is for the power timer 46 to time-out resulting in a high logic level to appear at the output Q3 of the counter 78 which causes the NOR gate 102 to output a low level and the mode latch 44 to be reset as described above.

As stated above, the mode latch 44 and control unit 56 function to mute the transmitter 26 and receiver 28 when the amplifier 30 is operative in both the monitor and talk modes. The talk mode is when the switch 24 is positioned with the movable contact in contact with the terminal "T", as illustrated in FIG. 2, and the monitor mode is with the movable contact in contact with the contact "M". The control circuit 56 mutes the transmitter and receiver 26 and 28 which eliminates acoustic feedback to the amplifier 30 and loudspeaker 32 through the transmitter 26 and receiver 28. As explained above, experiments with the assignee's prior art amplifier and TS21 test unit have shown that unexpectedly the receiver 28 coupled audio back into the amplifier 30 and loudspeaker 32 to cause unacceptable howling and squealing. The control circuit 56 for the transmitter 26 does not interfere with the operation of the continuous polarity indicator 36. As stated above, the control circuit 56 short circuits the receiver 26 and open circuits the transmitter 28 during the operation of the amplifier 30.

The operation of the control circuit 56 in muting the transmitter and receiver 26 and 28 is as follows. When the "ring" line is negative with respect to the "tip" line, and the amplifier 30 is off, transistor 110 receives base drive from the tip side of the telephone line via the series network switch 34, which is described in detail below, resistor 112, Schottky diode 114, and resistor 116. It should be noted that if the loop current is high, transistor 110 receives additional base drive from diode 118. While in the on state, transistor 110 provides continuity from the series network switch 34 through terminal 120 of the transmitter 26 through transistor 110 to ground. If the amplifier 30 is switched on, a potential of roughly 7.8 volts from the amplifier is applied to the gate of field effect transistor 122 to cause it to turn on to short the receiver 28. In addition to turning on the field effect transistor 122, the drive from amplifier 30 also turns on transistor 124 via signal applied through resistor 126. The turning on of transistor 124 shunts the loop current and the drive current for transistor 110 causing it to be turned off and disconnecting the transmitter 26. When the "ring" side is positive with respect to the "tip" side and the amplifier 30 is off, continuity from the speech network 38 to the switched terminal 120 of the transmitter 26 is supplied through transistor 128. Transistor 128 receives its base drive from the "tip" side of the telephone line via the series network switch 34, resistor 112, Schottky diode 134, and resistor 132. If loop current is high, additional base drive is applied through diode 130. If the amplifier 30 is switched on, transistors 122 and 124 are turned on to mute the receiver 28. The on state of transistor 124 is not important in the operation of the muting circuit in this condition. When the amplifier 30 is turned on, optoisolator 135 turns on which turns on transistor 133. The turning on of transistor 133 shunts the loop current and the drive current for transistor 128.

The input to the amplifier 30 during the monitor mode is via the winding 136 which is an auxiliary winding of the network transformer having four additional windings of conventional construction. The function of winding 136 is specifically for coupling the desired level of line signals during monitor mode to the input of the amplifier 30 and is not found in a conventional network transformer having four windings 138'—138''''. In the talk mode with the switch 24 as illustrated in FIG. 2, the winding 136 inductively picks up both the output signals from the transmitter 26 and the received signals. In the monitor mode with the switch 24 in the position where the movable contact is in contact with the contact identified by "M", capacitor 140 couples tip line of the phone line to the amplifier 30 to provide an input which has a high impedance, such as 500K ohms, to cause negligible loading upon the operation of the audio network of the telephone line to which the coupling device 12 is coupled. The input to the amplifier 30 consists of DC blocking capacitor 142, and resistors 144 and 146. The resistors 144 and 146 are provided to cause a minimum voltage breakdown under transient surge conditions. Since the transmitter 26 is decoupled by the speech network 38 during the monitor mode, the control circuit 56 deactivates only the receiver 28 by short circuiting it as described above.

The series network switch 34 functions to disconnect the transmitter and receiver 26 and 28 from the telephone line during signalling so that direct current does not flow through the speech network during pulse signalling and during tone signalling the speech network does not load down the outgoing tone levels nor consume DC power which is needed by the tone signalling circuits 22. The function of the series network switch is described in detail in the aforementioned Ser. No. 813,156 wherein it is referred to as the "speech mute switch". The MOSFETs 148 and 150 are normally fully biased into conduction except when the optocoupler 152 is biased into conduction by the presence of a high level command $\overline{\text{MUTESW}}$ from the signalling circuits 22. DC blocking capacitor 154 and resistor 156 shunt the MOSFETs 148 and 150 with a relatively high impedance path compared with the impedance of the MOSFETs 148 and 150 in the on condition to provide a small amount of AC leakage around the series network switch 34 so that during signalling the pulses or tones may be audible through the loudspeaker 32 or receiver 28.

While the invention has been described in terms of its preferred embodiment, it should be understood that numerous modifications may be made thereto without departing from the spirit and scope of the invention as defined in the appended claims.

I claim:
1. A telephone test set comprising:
   means for coupling the test set to tip and ring lines of a telephone lines;
   means for transmitting signals on the telephone line and means for receiving signals on the telephone line; the means for transmitting and the means for receiving being selectively coupled to the means for coupling;
   selectively energizable amplifier means for amplifying signals appearing on the telephone line;
   speaker means coupled to the amplifier means for reproducing signals appearing on the telephone line; and
   control means for disabling the means for transmitting and the means for receiving when the amplifier means is energized to prevent acoustic feedback to the amplifier means.
2. A telephone test set in accordance with claim 1 further comprising:
   means for monitoring signals appearing on the telephone line; and wherein the amplifying means is selectively activable for amplifying signals appearing on the telephone line when the means for monitoring is activated.
3. A telephone test set in accordance with claim 2 further comprising:
   switching means for selectively choosing a monitoring mode wherein signals on the telephone line are monitored or a talk mode wherein the means for transmitting and means for receiving are coupled to the telephone line.
4. A telephone test set in accordance with claim 3 wherein the means for receiving is activated during the monitor mode.
5. A telephone test set in accordance with claim 3 wherein when the switching means selectively chooses the monitoring mode, the control means deactivates the means for receiving.
6. A telephone test set in accordance with claim 5 wherein the control means deactivates the means for receiving by short circuiting the means for receiving during the monitoring mode.
7. A telephone test set in accordance with claim 1 wherein the control means further comprises means for activating the means for amplifying, and when the means for amplifying is activated means for selectively choosing the gain of the amplifier means.
8. A telephone test set in accordance with claim 7 wherein the means for activating the means for amplifying and when the means for amplifying is activated the means for selectively choosing the gain of the amplifier means comprises:
   means for producing an input signal; and
   means, coupled to the means for producing an input signal, for sequentially counting three separate states in response to three successive input signals, each of the separate states respectively causing the amplifier means to operate in an off condition, at a first gain, and at a second gain.
9. A telephone test set in accordance with claim 1 further comprising signalling means selectively coupled to the means for coupling for producing signals to place a call on the telephone line or to place signals on the telephone line when in an activated state, the amplifier means being selectively energizable for amplifying signals produced by the signalling means.
10. A telephone test set in accordance with claim 9 further comprising series network switching means coupled between the coupling means and the means for transmitting and the means for receiving, the series network switching means having an open circuit condition for disconnecting the means for transmitting and the means for receiving from the coupling means when the signalling means is activated and a closed circuit condition when the means for transmitting and means for receiving is activated and further comprising a shunt circuit means for shunting the series network switching means which is coupled to the amplifier means when the series network switching means is in the open circuit condition.

* * * * *